Feb. 13, 1945. E. P. BULLARD, 3D., ET AL 2,369,209
TURRET HEAD LOCKING MEANS
Filed Dec. 12, 1939 2 Sheets-Sheet 1
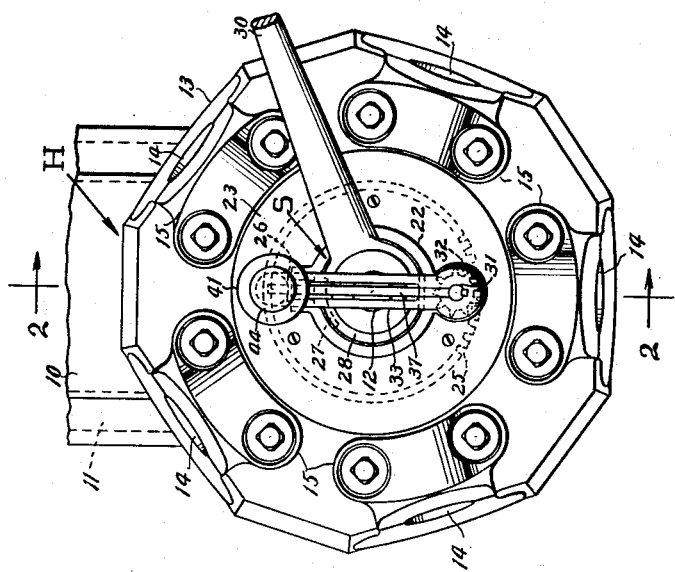
Fig. 1
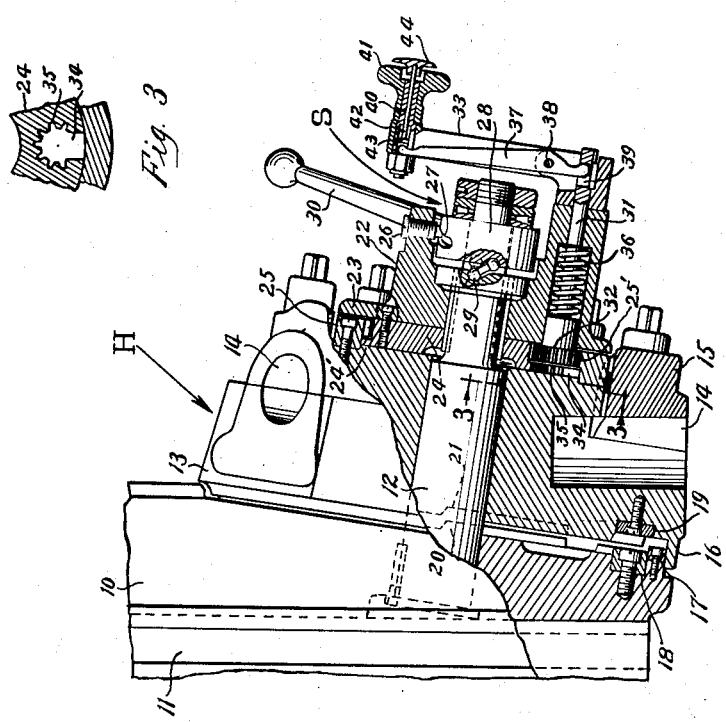
Fig. 3
Fig. 2
INVENTORS
EDWARD P. BULLARD III
EDWARD N. COWELL
PAUL H. LANGE
BY
ATTORNEY Feb. 13, 1945. E. P. BULLARD, 3D., ET AL 2,369,209
TURRET HEAD LOCKING MEANS
Filed Dec. 12, 1939 2 Sheets-Sheet 2

INVENTORS
EDWARD P. BULLARD III
EDWARD N. COWELL
PAUL H. LANGE
BY
ATTORNEY

Patented Feb. 13, 1945

2,369,209

UNITED STATES PATENT OFFICE 2,369,209

TURRETHEAD LOCKING MEANS

Edward P. Bullard, III, Fairfield, Edward N. Cowell, Stratford, and Paul H. Lange, Bridgeport, Conn., assignors to The Bullard Company, a corporation of Connecticut Application December 12, 1939, Serial No. 308,808

19 Claims. (Cl. 29—49)

This invention relates to apparatus for indexing a rotatable member to a plurality of stations, and particularly to apparatus for automatically locking the member at numerous points between said stations.

Although the principles of the invention may be applied to any rotatable member that is adapted to be indexed, they will be described in connection with the turret head of a lathe of the type shown in Patent 1,690,568 granted to E. P. Bullard.

Apparatus of the above referred to type, especially vertical turret lathes, journal the turret on a substantially horizontal stud for rotation in substantially a vertical plane. Many of the tools supported by the turret include long, relatively heavy shanks, which when mounted in a turret head produce a substantial torque that constitutes a hazard both to the operator and to the machine. Turret heads are mounted so that they can be rigidly locked with any of the tools in work-operating position. When it is desired to index the turret, means is actuated to release the rigid locking means, and should the operator inadvertently let go of the indexing crank or fail to hold it firmly, a large heavy tool in one of the tool supporting stations may cause the turret to rotate out of control of the operator with the result that he may be injured and/or the machine or tool broken due to the impact of the tool striking the machine or the work.

An object of this invention is to provide apparatus capable of overcoming the above and other difficulties encountered with prior-known turret head constructions.

Other objects of the invention include the provision of apparatus for automatically locking a rotatable member at numerous points between each of a plurality of index stations; the provision of apparatus in which a rotatable member is indexed by a rotatable axially-shiftable shaft adapted, in one of its axial positions, to lock the member at numerous points between each index station; and the provision of a turret head adapted to support a plurality of tools, and means for automatically locking the turret at numerous points between each of a plurality of index stations.

The above, other objects and novel features of the invention will become apparent from a consideration of the following specification and the accompanying drawings in which:

Figure 1 is a front elevational view of a turret head for a vertical turret lathe to which the principles of this invention have been applied;

Fig. 2 is a side elevational view of the turret head shown in Fig. 1, certain parts being broken away substantially along line 2—2 of Fig. 1;

Fig. 3 is a section substantially along line 3—3 of Fig. 2;

Figure 4:
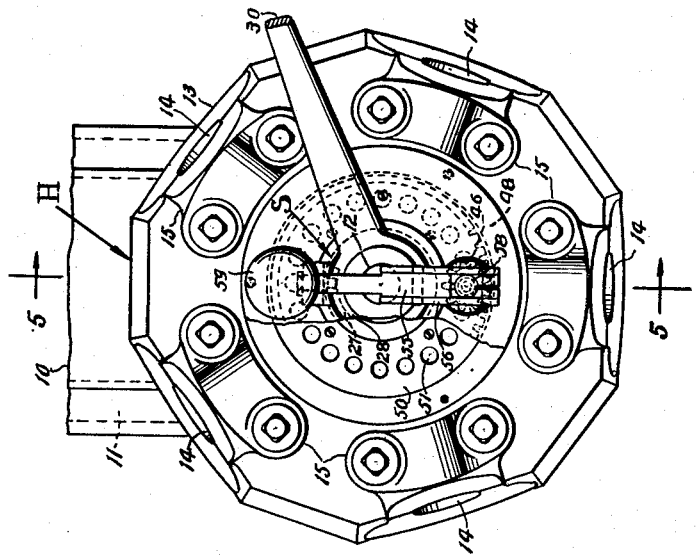
Fig. 4 is a front elevational view of a turret head similar to that shown in Fig. 1, but disclosing another embodiment of the invention.

Referring to Figs. 1 and 2, the invention is shown as applied to a turret head including a slide 10 having bearing grooves 11 on each side thereof. The bearing grooves 11 are adapted to slidingly engage a bearing member (not shown) that is attached to the lathe. The column 10 is provided with a stud 12 fixed thereto against rotative movement. A turret head H is journaled on the stud 12 and comprises a polygonal element 13, certain faces of which are provided with tool receiving openings 14 with which clamping elements 15 are adapted to cooperate to clamp a plurality of metal-working tools to the head H. The rear face of the turret head H is provided with a flange 16 adapted to overlie an undercut portion on the lower end of the slide 10. The flange 16 is additionally adapted to cooperate with a dirt-seal ring 17 likewise fixed to the lower end of the slide 10. The surface of slide 10, surrounding the stud 12, and that of the turret head H adjacent the slide are provided with annular locking rings 18 and 19. These rings are provided with radially disposed, alternately arranged raised and recessed portions 20 and 21. Each of the surfaces 20 and 21 are of relatively extended length and include interfitting tapered portions. There are as many raised and recessed surfaces 20 and 21 on the rings 18 and 19 as there are tool receiving stations 14 within the turret head H. The turret head H is adapted to be axially shifted along the stud 12 so that the surfaces 20 and 21 will inter-mesh and rigidly lock the turret head against rotative movement when a tool, in one of the openings 14, is located in work-operating position.

The turret head H is adapted to be axially shifted along the stud 12 by the combined action of a collar 22 and a shifting mechanism S. The collar 22 is substantially cylindrical and is provided with a flanged portion 23 that is connected to the turret H for axial movement therewith by a member 24 fixed to collar 22, and an internal ring-gear 25 fixed to the head, both of which members will be described later. This connection includes a flange 24' on the member 24 that fits within a recess formed between the edges of the teeth 25' on the ring-gear 25 and the one surface of the turret head H. The collar 22 is splined to the stud 12 and is provided with a cam-following pin 26 adapted to engage a cam groove 27 in the periphery of sleeve element 28. The sleeve 28 is mounted for rotative movement on the stud 12 but is held against axial movement therealong. The sleeve 28 and the pin 26 comprise the shifting mechanism S for axially moving the turret head H. A plurality of toggle joints 29 are mounted between the adjacent surfaces of the sleeve 28 and the collar 22 as more fully disclosed in Patent 1,690,568. A handle 30 is connected to the sleeve 28 for imparting oscillatory movement thereto. Oscillation of the sleeve 28 causes the pin 26 to follow the cam groove 27 to shift the collar 22 axially along the stud 12. Furthermore, oscillatory movement of sleeve 28 actuates the toggle joints 29 between the position shown in full lines and that shown in dotted lines in Fig. 2. Movement of the handle 30 in one direction causes the turret head H to be moved axially on the stud 12 and to effect inter-meshing engagement of the surfaces 20 and 21 provided the head H is in position to locate a tool opening 14 in work-operating position. Movement of handle 30 in the opposite direction will effect movement of head H in a direction along stud 12 to disengage the locking surfaces 20 and 21 and permit indexing of the head.

Indexing the turret head H is effected by intermittently turning the ring-gear 25 by a rotatable, axially-shiftable shaft 31 journaled in the non-rotatable collar 22. One end of shaft 31 is provided with a spur gear 32 adapted to remain in mesh with the internal teeth 25' of the ring-gear 25 in all of the axially-shiftable positions of the shaft. Rotation of the shaft 31 rotates the turret head H on the stud 12. The opposite end of the shaft 31 is provided with a crank 33 adapted to be rotated by the operator for indexing the turret head H from one tool station to another. The gear ratio between the gear 32 and the teeth 25' on the ring-gear 25 is such that one complete revolution of the crank 33 moves the turret head H from one tool-supporting station to another.

The means for locking the turret head H at numerous points between each index station of the head H comprises the member 24 that is splined to the stud 12. The member 24 is provided with an opening 34 that is aligned with gear 32 on shaft 31. Internal gear teeth 35 are formed within the opening 34 and are adapted to mesh with the teeth of gear 32. Shaft 31 is provided with an undercut portion adapted to receive a spring 36 that normally urges the gear 32 into meshing relation with gear teeth 35 of the member 24. The length of the gear 32 is such that its teeth remain partially enmeshed with the teeth 25' of ring-gear 25 when shaft 31 is in position where gear 32 is in mesh with teeth 35.

The crank 33 is provided with a pivoted link 37 mounted on a pin 38 in close proximity to the shaft 31. The lower end of the link 37 is adapted to be received within a slot 39 in the end of shaft 31. The crank 33 is likewise provided with a sleeve 40 at its free end. A handle 41 is journaled on the sleeve 40 for rotating the crank 33. The sleeve 40 provides a slide bearing for a reciprocable shaft 42 having an abutment portion 43 on its one end adapted to engage the end of link 37 opposite that which engages the shaft 31. The shaft 42 extends outwardly beyond the handle 41 and receives a pressure element 44.

From the foregoing description it is apparent that when the operator grasps the handle 41 of the crank 33, his palm will exert pressure against the element 44 forcing it inwardly, pivoting link 37 about pin 38 to move the shaft 31 to the right as viewed in Fig. 2 against the action of the spring 36, thereby shifting the gear 32 out of engagement with the internal gear teeth 35 in the opening 34. The crank 33 may then be turned to index turret head H. However, should the operator inadvertently release the handle 41, or fail to hold it sufficiently tight to prevent it rotating out of his grasp by the action of a relatively heavy tool in the turret head H, the spring 36 will immediately expand, shift shaft 31 to the left, as viewed in Fig. 2, and cause gear 32 to intermesh with the gear teeth 35 within the opening 34 of the non-rotatable member 24, and thereby lock turret head H at any point between the successive tool supporting stations 14 of the head H.

Figure 5:
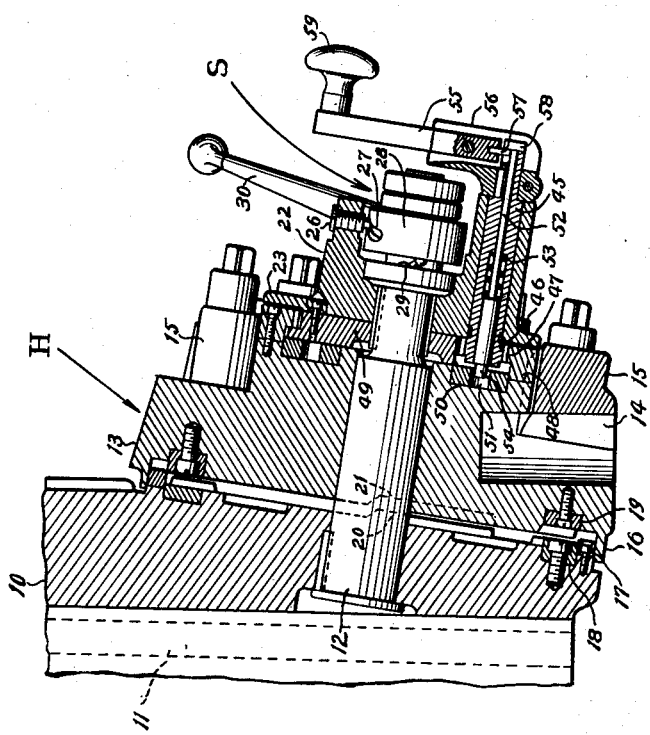
Fig. 5 is a sectional elevational view taken substantially along line 5—5 of Fig. 4.

Referring to Figs. 4 and 5, another embodiment of the invention is disclosed in which the general organization of the turret head is identical with that shown in Figs. 1 and 2. The head H of Figs. 4 and 5 is adapted to be indexed from station to station by a shaft 45 journaled within the collar 22 and fixed against axial movement. The shaft 45 is provided with a spur gear 46 that is maintained in constant mesh with the teeth 47 of the ring gear 48 that is fixed to the turret head in the same manner that gear 25 is fixed to the head H in the embodiment shown in Fig. 2.

A disc 49 is provided between the collar 22 and the head H. The disc 49 is similar to, and adapted to function in the same manner as the member 24 of Fig. 2, namely, to serve as a connection between the collar 22 and the head H to cause axial movement of the head when the collar is axially moved by the shifting mechanism S. An annular member 50 is fixed to the turret head H between the head and the disc 49, and is provided with a plurality of closely spaced openings 51 arranged in a circle of such diameter that each opening 51 passes in alignment with the end of the shaft 45 as the head H is indexed from station to station.

The shaft 45 is drilled to receive a reciprocable member 52, and counterbored to receive a spring 53 that abuts against a surface on the member 52 thereby urging a plunger portion 54 of the member 52 into cooperating engagement with the openings 51 in the member 50.

A crank member 55 is connected to the shaft 45 through an elbow member 56 keyed thereto. The crank 55 is pivotally connected to the member 56. One end of the crank is provided with a finger 57 adapted to engage a head 58 on the end of the reciprocable member 52, and the opposite end of the crank is provided with a handle 59.

From the foregoing description of Figs. 4 and 5, it is apparent that when the operator grasps the handle 59 and exerts an inward force toward the head H, the crank 55 will pivot about its pivot pin causing the finger 57 to move the member 52 to the right, as viewed in Fig. 5, against the action of the spring 53 thereby withdrawing the plunger portion 54 from within an opening 51 in disc 50. While in this position, the crank 55 may be turned to index the turret head H about the stud 12. Should the operator inadvertently let go of the handle 59, the spring 53 will cause the member 52 to move toward the left, as viewed in Fig. 5, whereupon the portion 54 will seat within an opening 51 of the annular member 50, thereby locking the head H to the stud 12.

Although the various features of the improved turret-locking apparatus have been shown and described in detail to fully disclose two embodiments of the invention, it will be evident that numerous changes may be made in such details and certain features may be used without others, without departing from the principles of the invention.

We claim:

1. Apparatus comprising in combination, a member adapted to be indexed from station to station; means for indexing said member; means for locking said member at each of said stations; and means separate from both said indexing and said station-locking means but adapted to cooperate with said indexing means for locking said member at numerous points between each station.

2. Apparatus comprising in combination, a member adapted to be indexed from station to station; axially-shiftable means for indexing said member; means for locking said member at each of said stations; and means separate from said station-locking means and adapted to cooperate with said axially-shiftable means for locking said member at numerous points between each station.

3. Apparatus comprising in combination, a rotatable member journaled on a stud; a supporting element splined to said stud; a rotatable, axially-shiftable shaft journaled in said supporting element and provided with a gear in mesh with a gear fixed to said member, the gear on said shaft being adapted to remain in mesh with the gear fixed to said member in all axially-shiftable positions of said shaft; means for rotating said shaft to index said member to a plurality of stations; means for locking said member at each of said stations; and means adapted to cooperate with said shaft in one of its axially-shiftable positions for locking said member at numerous points between each of said stations.

4. Apparatus as claimed in claim 2, in which said axially-shiftable means is resiliently urged toward a position in which it cooperates with the means for locking said rotatable member at numerous points between each station.

5. Apparatus as claimed in claim 2, in which a rotatable crank is provided for said indexing means, and means between said crank and said shiftable means adapted to shift said axially-shiftable means away from the position where it cooperates with means for locking the rotatable member at numerous points between each station.

6. Apparatus comprising in combination, a rotatable member; means for indexing said member to a plurality of stations; means for locking said member at each of said stations; axially-shiftable means; resilient means for urging said axially-shiftable means toward a position in which it cooperates with means separate from said station-locking means for locking said rotatable member at numerous points between each station; and a crank associated with said indexing means including means for shifting said axially-shiftable means away from said position against the action of said resilient means.

7. In a machine tool, the combination of a turret journaled on a stud and adapted to support a plurality of tools; a non-rotatable supporting member mounted on said stud; a rotatable, axially-shiftable shaft journaled in said supporting member; a gear fixed to said shaft in mesh with a gear fixed to said turret, the gear on said shaft being adapted to remain in mesh with the gear fixed to said turret in all axial positions of said shaft; and non-rotatable means adapted to cooperate with said shaft in one of its axial positions for locking said turret at numerous points between each tool-supporting station.

8. In a machine tool as claimed in claim 7, in which said non-rotatable means comprises a disc provided with a plurality of gear teeth adapted to mesh with the gear fixed to said shaft in one of the axial positions of said shaft.

9. In a machine tool as claimed in claim 7, in which said non-rotatable means comprises a disc fixed to said stud and provided with an opening in alignment with said axially shiftable shaft; and internal gear teeth at least partially surrounding the periphery of said opening adapted to mesh with the gear on said shaft when said shaft is in one of its axial positions.

10. In a machine tool, the combination of a turret adapted to support a plurality of tools; a rotatable, axially-shiftable shaft for indexing said turret; means for locking said turret in work-operating position for each tool-supporting station of said turret; non-rotatable means adapted to cooperate with said shaft in one of its axial positions for locking said turret at numerous points between each tool-supporting station; resilient means for urging said shaft toward said shaft-cooperating means; and a crank attached to said shaft including means for shifting said shaft axially away from said shaft-cooperating means against the action of said resilient means.

11. In a machine tool as claimed in claim 10, in which said crank includes a pivotally mounted link, one end of which engages said shaft, and the other end of which cooperates with a reciprocable plunger.

12. In a machine tool a turret head journaled on a stud and provided with a plurality of tool-supporting stations; a support splined to said stud; a shaft journaled in said support and provided with a gear in mesh with a gear fixed to said turret; means for locking said turret head with any of said tool-supporting stations in work-operating position; and means rotatable with said turret head adapted to cooperate with axially-shiftable means for locking said turret head at numerous positions between each tool-supporting station.

13. In a machine tool as claimed in claim 12, in which the rotatable means comprises an annular member having means located at numerous points between each tool-supporting station of said turret head adapted to cooperate with said axially-shiftable means.

14. In a machine tool as claimed in claim 12, in which the rotatable means comprises an annular member fixed to said turret head and provided with a plurality of openings between each tool-supporting station of said turret head, said openings being arranged in a circle about said annular member so that they pass into aligned relation with said axially-shiftable means as said turret head is indexed.

15. In a machine tool, the combination of a turret head adapted to support a plurality of tools; a rotatable shaft for indexing said turret head; means for locking said turret head in work-operating position for each tool-supporting station thereof; rotatable means adapted to cooperate with axially-shiftable means for locking said turret head at numerous points between each tool-supporting station; resilient means for urging said axially-shiftable means into cooperating engagement with said rotatable means; and a crank attached to said rotatable shaft including means for shifting said axially-shiftable means away from said rotatable means against the action of said resilient means.

16. In a machine tool as claimed in claim 15, in which said crank is pivotally mounted on a member keyed to said rotatable shaft, and in which one end of said crank engages said axially-shiftable means, and the other end of which is provided with a handle.

17. In a machine tool as claimed in claim 15, in which said axially-shiftable means comprises an axially-shiftable shaft positioned within an axial bore in said rotatable shaft, and said crank is connected to said axially-shiftable shaft.

18. In a machine tool, a member adapted to be indexed from station to station; manual means for indexing said member; means for locking said member at each of said stations; means separate from both said indexing and station-locking means but adapted to cooperate with said indexing means for locking said member at numerous points between each station; resilient means for normally impelling cooperation between said separate and indexing means; and means associated with said manual means for rendering said resilient means ineffective when it is desired to index said member, the construction and arrangement being such that said resilient means causes locking of said member upon release of said manual means.

19. In a machine tool, a turret adapted to be indexed from station to station about a substantially horizontal axis and to support a plurality of relatively heavy tools of unequal weight; means for indexing said turret to a plurality of stations about said axis; means for locking said turret at each of said stations; and means separate from said indexing means but adapted to cooperate therewith for locking said turret at numerous points between each station.

EDWARD P. BULLARD, III.
EDWARD N. COWELL.
PAUL H. LANGE.